United States Patent [19]

Chicoine

[11] 4,418,331
[45] Nov. 29, 1983

[54] MANUALLY OPERATED DEACCELERATION WARNING SYSTEM WITH VACUUM CONTROLLED OVERRIDE

[76] Inventor: Gustave J. Chicoine, 1052 Cumberland Pl., San Jose, Calif. 95125

[21] Appl. No.: 339,751

[22] Filed: Jan. 15, 1982

Related U.S. Application Data

[63] Continuation-in-part of Ser. No. 131,158, Mar. 17, 1980, abandoned.

[51] Int. Cl.³ .................. B60Q 5/00; G08B 21/00
[52] U.S. Cl. .................................. 340/72; 340/60
[58] Field of Search .................. 340/72, 60, 52 R

[56] References Cited
U.S. PATENT DOCUMENTS

| | | | |
|---|---|---|---|
| 2,787,778 | 4/1957 | Lipe | 340/75 |
| 3,501,742 | 3/1970 | Ellison | 340/71 |
| 3,821,701 | 6/1974 | Ross | 340/71 |
| 3,863,211 | 1/1975 | Latham, Jr. | 340/60 |
| 3,882,452 | 5/1975 | Stevens | 340/60 |
| 3,891,986 | 6/1975 | Mulrooney | 340/22 |
| 3,911,394 | 10/1975 | Shames | 340/71 |
| 4,105,994 | 8/1978 | Chicoine | 340/71 |
| 4,158,833 | 6/1979 | Chicoine | 340/72 |
| 4,162,384 | 7/1979 | Chicoine | 200/61.88 |
| 4,267,545 | 5/1981 | Drone et al. | 340/60 |

*Primary Examiner*—Donald J. Yusko
*Attorney, Agent, or Firm*—Paul Hentzel

[57] ABSTRACT

A deacceleration warning system employs relay isolation between a control loop containing a driver controlled switch, and an operating loop for activating the braking lamps. The relay bypasses the brake pedal switch for use during downshift deacceleration for manually flashing the braking lamps. A vacuum controlled mode switch in the control loop holds the system in a disable mode except during downshift deacceleration. The enable mode is temporarily established when the accelerator pedal is lifted by an increase in the manifold vacuum. Electrical, mechanical, and thermal termination transients within the control loop, the relay structure, and operating loop cause electrical, mechanical and thermal lags which prolong the trailing edge of the manual flash beyond the release of the hand operated switch. This post-release illumination assures that the warning flash cycle will have at least a minimum duration independently of the depression period of the switch.

10 Claims, 4 Drawing Figures

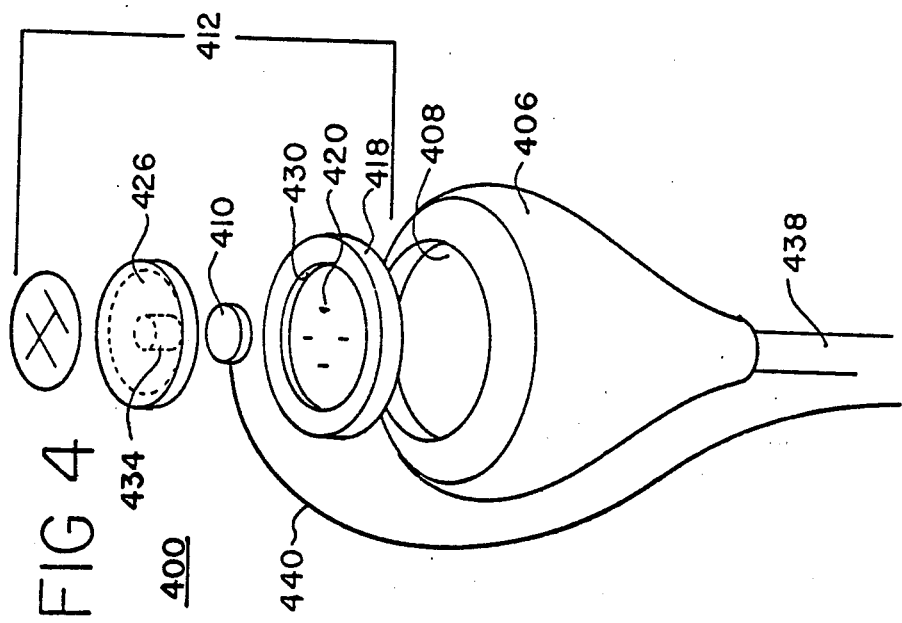
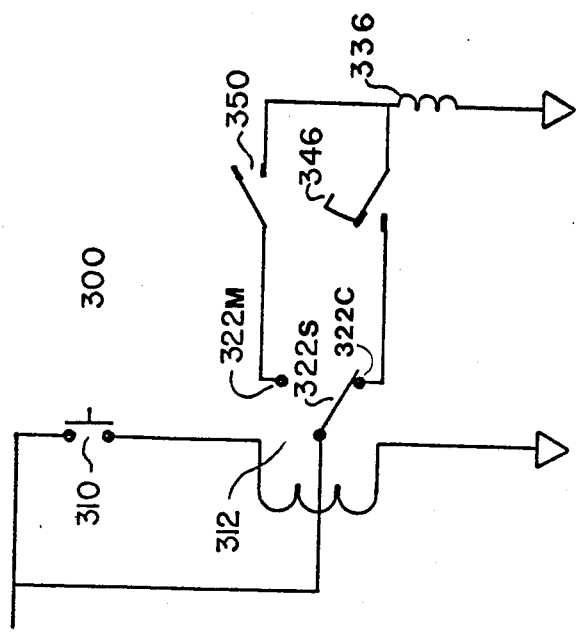

MANUALLY OPERATED DEACCELERATION WARNING SYSTEM WITH VACUUM CONTROLLED OVERRIDE

This application is a continuation-in-part of application Ser. No. 131,158 (now abandoned) entitled *SOLENOID INTERFACE FOR A MANUALLY OPERATED DEACCELERATION WARNING SYSTEM* filed on Mar. 17, 1980 by the present Inventor, and Applicant hereby claims priority for the common subject matter therebetween.

TECHNICAL FIELD

This invention relates to a vacuum enable, double loop, deacceleration warning systems for vehicles, and more particularly to such systems employing a solenoid isolation between the driver control loop and the lamp operating loop.

BACKGROUND

Heretofore, single loop deacceleration warning systems have permited drivers to indicate deacceleration while downshifting: U.S. Pat. Nos. 4,105,994, 4,162,384, 4,158,833 all to Chicoine, Ross U.S. Pat. No. 3,821,701 and Ellison U.S. Pat. No. 3,501,742. The switches were in direct series with the braking lamps, and were exposed to arcing by the heavy lamp current. As these systems aged, oxide buildup on the contacts caused a high impedance connection therebetween. The resulting voltage loss across the switch reduced the voltage appearing across the braking lamps, causing a loss in lamp intensity. Variations in driver contact pressure, further aggravated the unreliability impedance of the oxidized contacts. In addition, the rate of operation between drivers varied producing corresponding variations in the lamp intensity and activation period. A rapid flash is less noticeable by other drivers. If the flash period is too short, the braking lamps are prematurely deactivated and fail to reach an operating brightness.

Prior art double loop warning systems such as Shames U.S. Pat. No. 3,911,394, Mulrooney U.S. Pat. No. 2,787,778, and Lipe U.S. Pat. No. 3,891,986 provided isolation to varying degrees.

All of the prior art systems were subject to intentional and inadvertent activation during times other then deacceleration.

SUMMARY

It is therefore an object of this invention to provide a double loop vehicle deacceleration warning system with a vacuum enable/disable override.

It is another object of this invention to provide such a warning system which has a minimum enable-to-disable transient time.

It is another object of this invention to provide such a warning system which has a finite, but constant disable-to-enable transient time.

It is another object of this invention to provide such a warning system in which inadvertent warning flashes are minimized.

It is another object of this invention to provide such a warning system in which the manually operated switch is electrically isolated from the braking lamp activation current.

It is another object of this invention to provide such a warning system in which contact arcing and oxidation is minimized in the control loop switches.

It is a further object of this invention to provide a vehicle deacceleration warning system which is inexpensive, may be easily retrofitted and tested, has a longer life, and provides increased deacceleration safety.

It is a further object of this invention to provide a vehicle deacceleration warning system in which the warning lamps remain activated at operational intensity for a predetermined period after the manually operated switch is released.

BRIEF DESCRIPTION OF THE DRAWING

Further objects and advantages of the present warning system and the operation of the vacuum override and isolation relay, will become apparent from the following detailed description and drawing in which:

FIG. 3 is a schematic diagram of an manually flashed embodiment in which the braking lamps may be flashed during conventional pedal braking; and FIG. 4 is an exploded view of a gear shift control knob and lever showing the internal structure of an embodiment of the hand operated switch mounted thereon.

DETAILED DESCRIPTION

Figure 1:
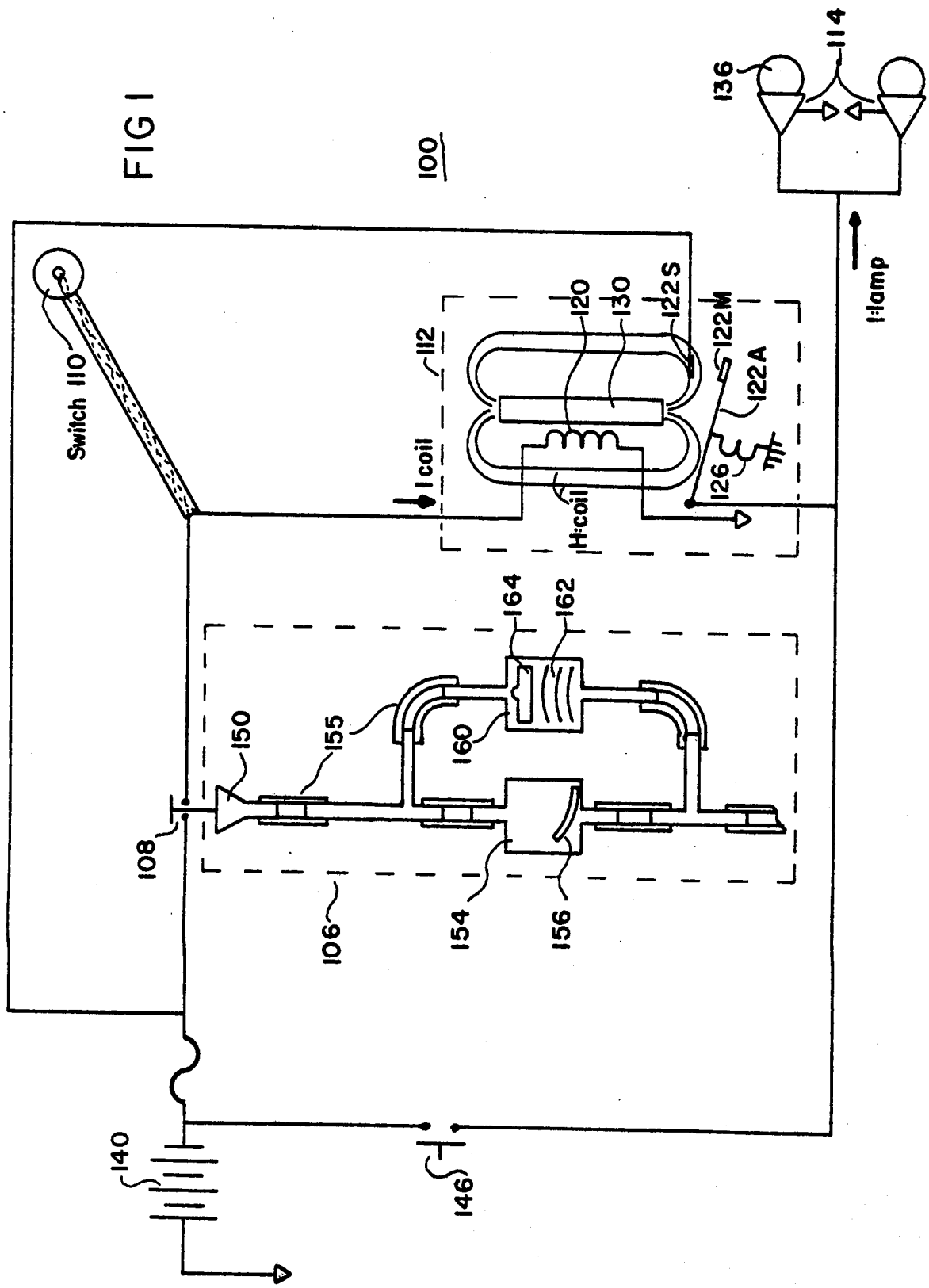
FIG. 1 is a schematic diagram of the deacceleration warning system mounted within a vehicle.

Deacceleration warning system 100 (see FIG. 1) is formed by an enable-disable mode controller 106 with mode switch 108, a hand operated switch 110, single pull-single throw (SPST) relay 112 responsive to switches 108 and 110, and warning lamps 114 activated by relay 112. Switch 110 may be any suitable normally open, press-to-close switch, such as a pushbutton, disc, or touch switch, positioned within the drivers zone of control. Switch 110 may be mounted on the deacceleration control lever 116 and adjusted to the desired height and azmith as discribed in the aforementioned Chicoine patents.

While cruising at a constant speed, warning system 100 is maintained in the disable mode by vacuum responsive mode controller 106. The low steady state vacuum in the intake manifold is continuously monitored by the mode controller. A limited enable mode window is established by high vacuum transients generated when the accelerator pedal is raised prior to deacceleration. Mode switch 108 is temporarily closed by mode contoller 106, and warning system 100 becomes enabled. During the enable mode, the driver may press switch 110 causing control current I:coil to energize coil 120 of relay 112 and displace relay armature 122A. Relay contacts 122S (stationary) and 122M (movable) snap close permitting lamp current I:lamp to activate warning lamps 114. Contacts 122 are normally open due the resilience of relay bias member 126. The magnetic field H:coil established within relay core 130 by I:coil overcomes the resilience of spring 126, permitting armature 122 to pivot causing relay contact 122M to move into engagment with contact 122S. I:lamp in the operating loop immediately elevates the temperature of filaments 136 within lamps 114 causing them to incandesce. The current for both relay 112 and warning lamps 114 is provided from a suitable electric power source such as storage battery 140 through fusing device 142. Relay 112 bypasses braking switch 146, which activates warning lamps 136 during conventional brake pedal deacceleration.

As the driver releases switch 110, I:coil terminates causing contacts 122 to separate. I:lamp then terminates causing filaments 136 to cool and lose incandesce. The incandescence of lamps 114 is maintained beyond the release of manual switch 110 by a delay in the separation of contacts 122 due to the inductive lag of coil 120, the mechanical lag of relay 112, and the magnetic lag of core 130. The incandescence of lamps 114 is further maintained beyond the separation opening of relay contacts 122 by the inductive lag of the distributed inductance of warning lamp lead 148, the separation lag of contacts 122, and the thermal lag of filaments 136.

As a consequence of these lag transients, lamps 114 are maintained at an operational brightness for at least the transient period required to dissipate the stored energy associated with each of the above factors. These lag transients prevent system 100 from responding to rapid switching cycles, which in the prior art device generated short, low intensity flashes. The lag transient period following relay closure is sufficient to activate lamps 114 at an operational brightness.

Abhorted switching cycles in which switch 110 is released prior to relay closure, is avoided by the tactile feedback cues generated by the snapping of switch 110. The snaps assist the driver in establishing a switching cadence in which switch 110 is not released until relay contacts 122 engage.

The low value of control current I:coil through mode switch 108 and hand operated switch 110, minimizes arcing and oxide buildup on the switch contacts. Further, even if high impedance oxides do develope over time; the control loop voltage lost across these switches is isolated by interface relay 112, from the operating voltage appearing across lamps 114. Arcing due to the heavier operating current I:lamp does not materially affect relay contacts 122, which are designed to withstand the spark impact over the life of the relay.

AUTOMATIC ENABLE AND DISABLE MODES

Mode switch 108 is normally open (disable mode), and is closed (enable mode) by vacuum transients generated in the intake manifold (not shown) when the driver raises the accelerator pedal. The movable electrode of switch 108 is connected to a diaphragm 152 formed on vacuum chamber 150. Chamber 150 is volume responsive to the manifold vacuum force. A manifold vacuum force greater than a predetermined force, displaces the diaphragm inward, forcing the movable electrode into engagement with the stationary electrodes of switch 108 to enable system 100. System 100 is returned to the disable mode when the vacuum force decreases, displacing the diaphragm outward to disengage the electrodes of mode switch 108.

A disable valve 154 is in fluid communication with chamber 150 and the intake manifold through a suitable conduit such as tubing 155. Disable valve 154 permits air to enter into chamber 150 from the manifold. When the operator depresses the accelerator pedal, the manifold vacuum force is reduced. Air from the manifold pushes seal 156 open (as shown in FIG. 1) and flows into chamber 150, displacing diaphragm 152. Disable valve 154 preferable has a high flow rate for rapidly opening switch 108 and causing a "fast disable". Disable valve 150 may be any suitable unidirectional flow device such as a check valve for opposing the return flow of air back into the manifold.

An enable valve 160 connected in bypass relationship across disable valve 154, permits the flow of return air. When the operator raises the accelerator pedal to slow down, a high vacuum transient appears in the manifold. Enable valve 160 opens (as shown in FIG. 1) and air is removed from chamber 150, causing the chamber to contract and close mode switch 108. Enable valve 160 preferable has a lower forward flow rate than disable valve 154 for delaying the closure of switch 108 causing a "slow enable". This delay of the enable mode causes warning system 100 to holdover in the disable mode for a brief period after the accelerator is raised. Such a holdover prevents inadvertent activation of warning system 100 during upshifting.

Enable valve 160 is also a suitable unilateral flow device for opposing the flow of air into chamber 150. A spring 162 within enable valve 160 urges seal member 164 in the closed position. A predetermined vacuum force from the manifold is required in order to open enable valve 160. Spring 162 establishes a fixed vacuumhead within chamber 150. As the manifold vacuum force increases due to a lowered vehicle cruising speed, the chamber vacuum also decreases. The chamber vacuum follows the manifold vacuum, displaced by the vacuumhead. Whenever the throttle pedal is raised in preparation for deacceleration, the resulting high transient vacuum has the same fixed vacuumhead to overcome before opening enable valve 160 and extracting air from chamber 150. The disable-to-enable transient time has a fixed maximum duration independent of the cruising speed of the vehicle just immediately before accelerator release. A fixed amount of air (or less) must be removed from chamber 150 each time because of the fixed vacuumhead.

Mode controller 106 may be mounted under the dash with a suitable conduit such as tube/connecting to the intake man.

Mode controller 106 does not require a road test to be tested. The proper operation of mode controller 106 may be determined while the vehicle is parked. The operator merely "revs up" the engine, and releases the accelerator pedal with the hand operated switch 110 pushed closed. The brake lamps while light up for a short period due to the vacuum transient introduced in the manifold.

BRIGHTNESS MAINTAINING EFFECT OF THE STORED ENERGY

Figure 2:
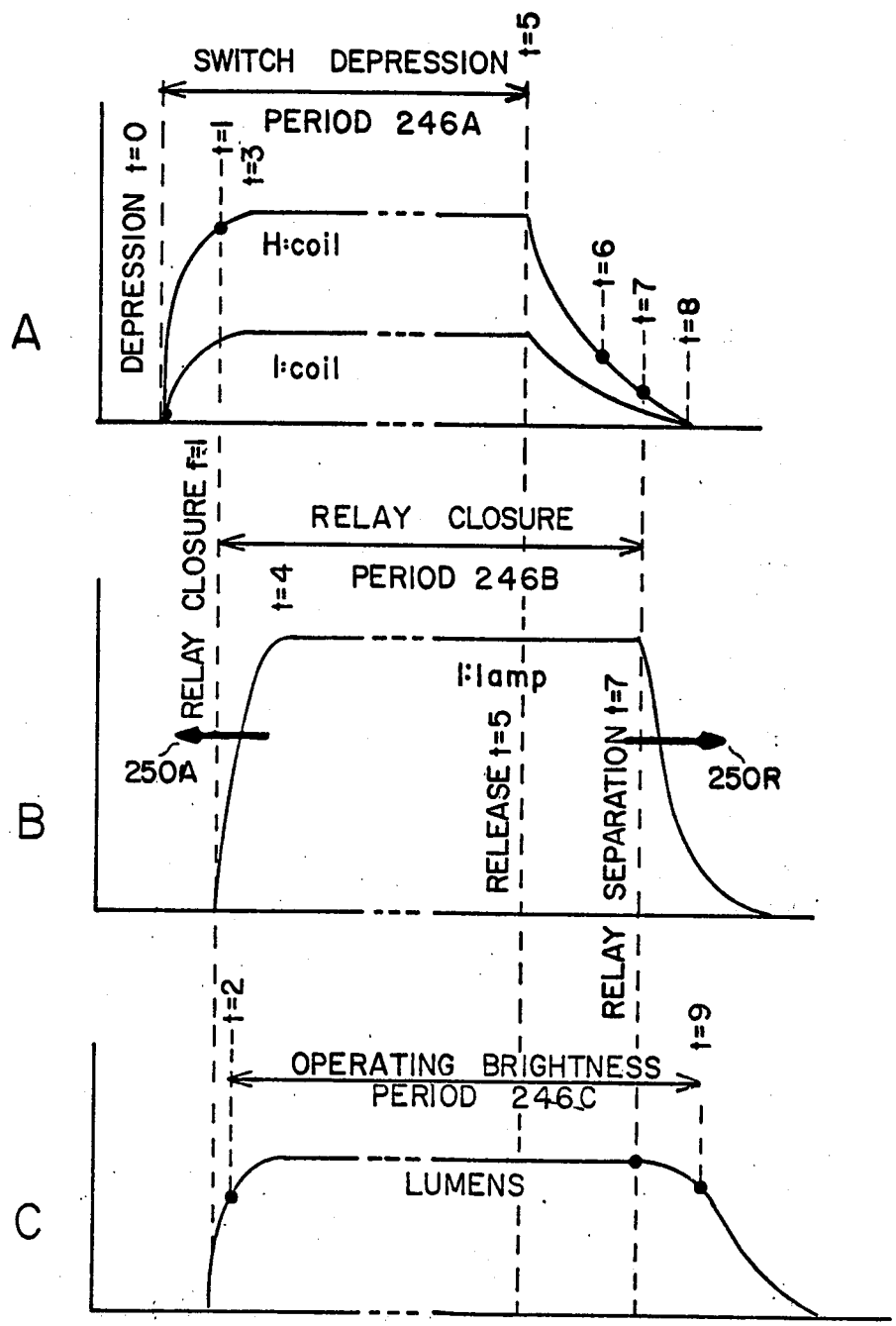
FIGS. 2A-C are timing diagrams of the flashing cycle of the warning system of FIG. 1 showing the intensity maintaining effect of stored energy.

The timing diagram of FIG. 2 shows a complete warning flash cycle of system 100, revealing the cause and effects of the various transient lags, and time relationships of the stored energies which prolong the incandescence after switch 110 is released.

I:coil is initiated (see FIG. 2A) when switch 110 is depressed by the driver (t=0). I:coil rises through the low resistance control circuit developing the magnetic field H:coil around coil 114, and reaches a steady state value of a few milliamperes (t=3). Just prior to steady state conditions in the control loop, H:coil becomes strong enough to close relay contacts 122 (t=1). The driver maintains the low control loop resistance during driver depression period 246A (t=0 to t=5). The driver releases switch 110 (t=5), returning the control loop to the normal high impedance condition. I:coil is maintained beyond t=5 by the inductance L:coil which discharges H:coil through the high impedance control circuit. The collapse of H:coil (t=5 to t=8) requires more time than the buildup of H:coil due to the high impedance of switch 110 during collapse. During H:coil collapse, the strength of weakening magnetic field H:coil becomes insufficient to hold contacts 122 closed against the tension of spring 126 (t=6), permitting contacts 122 to separate and return to the open position (t=7).

The strength of H:coil required to maintain contacts 122 closed (t=1 to t=6) is much less than the strength to required to initially displace contact 122M into engagment with contact 122S. This mechanical effect is caused by the lower magnetic strengths of H:coil at the distant open position of contact 122M relative to the higher magnetic strength of H:coil at the closed proximate position of contact 122M. A corresponding mechanical lag is generated in each flash cycle because the lower H:coil strength occurs at t=5, late during the collapse of H:coil, after switch 110 is released at t=5. A magnetic lag within ferrite core 130 further delays the actual separation of contacts 122 (t=7), due to lingering characteristic of magnetism. The magnetic domains within the core 130 do not return to the premagnetized state immediately upon the loss of the sustaining magnetic field H:coil.

When relay contacts 122 close (t=1), I:lamp rises rapidly in the operating circuit, opposed only by the distributed inductances of warning lamp supply lead 148. I:lamp reaches steady state at t=4, and maintains this maximum value until t=7 when relay contacts 122 separate. Contacts 122 remain closed during relay closed period 246B (from t=7) until the expiration of the inductive lag of coil 120, the mechanical lag of relay 112, and the magnetic lag of core 130.

The temperature of lamps 116 increase in response to I:lamp, (see FIG. 2C) causing filaments 136 to incandesce. At t=2, filaments 136 have reached a temperature sufficient to incandesce at an operating level within 3 db of the maximum brightness.

Operating brightness period 246C is maintained from the leading 3 db power point (t=2) to the trailing 3 db power point (t=9), extending a substantial period beyond switch 110 release (t=5). The rise of filament temperature is responsive to I:lamp resistance losses within filaments 136; and is not symmetrical with the decline of filament temperature which is due to the mutual effect of loss of I:lamp and cooling through radiation.

Energy to maintain incandescence after switch release is supplied by electrical and thermal transients within system 100. Maximum brightness is maintained by the full I:lamp from switch release (t=5) to relay open (t=7). A diminishing but operable brightness is maintained above the 3 db level from relay open (t=7) to the trailing 3 db power point (t=9) by the distributed inductance lag of lead 148, the separation lag of contacts 122, and the finite time required for filaments 136 to cool from full emission level to the 3 db emission level.

The energy stored in the magnetic field of an inductance is proportional to the square of the current. The small value of the distributed inductance relative to L:coil is compensated for by the large value of I:lamp relative to the small value of I:coil. In a typical automobile application, the operating current I:lamp may be several amperes; exceeding the milliampere level control current I:coil by a factor of a thousand.

Separation lag is caused by opposing plasma forces created by I:lamp during gap formation between contacts 122. Force and time are required to generate the ions accompanying contact separation in dc applications.

These energy transients establish a fixed termination transient period (t=5 to t=9) which is beyond the control of the driver. Driver pressure period 246A may be increased by the driver to provide warning flashes of longer duration. However, the warning flash may not be shortened to less than the termination transient period (t−5 to t=9) no matter how fast the operator releases switch 110. Once relay contacts 122 close (t=1), a definitive warning flash must follow having an operating brightness and a duration at least as long as the termination transient period.

The energy transient period may be increased to provide a longer warning flash by adjusting the tension of spring 126. Spring 126 maintains contacts 122 in the normally open position and returns contacts 122 to the open position at contact separation (t=7). Decreasing the tension of spring 126 will retard contact separation (t=7) as indicated by the arrow 250R, because the decreasing H:coil will overpower the tension and maintain contacts 122 closed for a longer period after switch 110 release. A lower tension causes a corresponding advance in the closure of relay 112 (t=1) as indicated by arrow 256A, which minimizes the possibility of an abhortive switch cycle which is too fast to energize relay 112.

EMERGENCY FLASHING

SPDT relay 312 (see FIG. 3) may be employed in emergency flashing circuit 300 for permitting the driver to flash brake lamp 336 during conventional brake pedal deacceleration. Relay armature 322A is shown in the resting position, engaging normally closed contact 322C. Voltage for activating lamps 336 is applied to armature 122A, across the arm contact 322A-stationary contact 322S engagement, to normally open brake pedal switch 346. When brake switch is closed during brake pedal displacement, brake lamp 336 is activated. Brake pedal activations are typically long, continuous flashes. The driver can interrupt this flash with short brakes by repeatedly operating manual switch 310, causing relay 312 to chatter. Armature 322A jumps back and forth between normally open contact 322O and normally closed contact 322C. Lamp 336 is activated in either position of armature 322A; but are briefly deactivated during the motion period or flight time between stationary contacts. A flash interruption is produced each time switch 310 is either pressed or released. Relay 312 interrupts the normal continuous braking flash during energization and also during re-energization. The interruption time may be increased by employing a delay type relay for establishing a more pronounced break in the warning flash. Delay relays have a spring tension and air gap specifically designed to maximize the flight time. In addition, these relays may employ a copper slug or sleeve around the coil which increases the switching time response.

During downshift deacceleration, braking switch 346 remains closed; and manual switch 310 is separated to move armature 322A and activate brake lamps 336.

If desired, flasher 350 may be installed in series in the operating loop to automatically break the operating current in order to flash brake lamps 114 while switch 110 is continuously depressed. During pedal braking, the driver has the option of not depressingswitch 310 resulting in a single continuous warning flash of braking lamps 336; or of depressing switch 310 to energize flasher 350 resulting in a series of warning flashes.

MANUAL SWITCH STRUCTURE

In wafer switch structure 400 (see FIG. 4), knob 406 is provided with a recess 408 for retaining a correspondingly shaped wafer assembly 412. Rigid base 418 is mounted within recess 408 by a suitable adhesive, and has four locating tabs 420 for positioning miniature switch 410. Flexible top member 426 engages peripheral shoulder 430 of base 418 for covering switch 410. Pin 434 extending downwardly from top member 426 operates switch 410 when top member 426 is pressed by the driver. A suitable decal containing control positions of lever 438 may be mounted on top member 426. Fusible lead 440 may be employed for connecting switch 410 to the interface relay. The thinness of wafer structure 400 permits gear shift knobs to be easily retrofitted to provide manual deacceleration warnings. Alternatively, a one piece, resilient hollow knob may be employed for housing wafer structure 400.

CONCLUSION

It will be apparent to those skilled in the art that the objects of this invention have been achieved by providing a vacuum controlled double loop warning system having a low current control loop, and a heavy duty operating loop with an interface relay therebetween.

Clearly various changes may be made in the structure and embodiments shown herein without departing from the concept of the invention. Further, the features of each embodiment shown in the various Figures may be employed with the embodiments of the other Figures.

Therefore, the scope of the invention is to be determined by the terminology of the following claims and the legal equivalents thereof.

I claim as my invention:

1. A warning system for downshifting deacceleration of vehicles having an internal combustion type engine with an intake manifold vacuum responsive to acceleration and deacceleration, the warning system having a hand operated control loop which is automatically enabled and disabled in response to the manifold vacuum force, and a lamp operating loop which is separated from the control loop by an isolation relay therebetween, comprising:
   a control loop;
   a control power source means for providing control current to the control loop;
   vacuum operated mode controller means connected in the control loop and automatically responsive to variations in the manifold vacuum force for enabling the warning system by permitting control current to flow in the control loop, and for disabling the warning system to override the hand operation by preventing control current to flow in the control loop;
   a normally open, push-to-close, hand operated switching means mounted on the downshift control lever and connected in the control loop for initiating the flow of control current through the control loop during downshift deacceleration warning when the the warning system is enabled by the mode controller and the hand operated switching means is closed by the operator, and for terminating the flow of control current through the control loop when the hand operated switching means is released to open by the operator;
   an isolation relay coil connected in the control loop, and responsive to control current flowing through the control loop during downshift deacceleration warning for generating a magnetic field;
   an operating loop;
   an operating power source means for providing operating current to the operating loop;
   deacceleration warning lamp means connected in the operating loop for incandesing in response to operating current from the operating power source means when operating current flows through the operating loop;
   isolation relay contacts at least one of which is movable from an open position distant from the isolation relay coil to a closed position proximate to the isolation relay coil in response to the magnetic field for moving the movable contact into electrical engagement with the other contact to complete the operating loop permitting operating current to flow through the warning lamps, the movable contact returning to the open distant position in resonse to the termination of the magnetic field.

2. The warning system of claim 1, wherein the vacuum mode controller means comprises:
   a vacuum chamber at least a portion of which is position responsive to the manifold vacuum force; and
   vacuum switch means responsive to the chamber displacement for closing and enabling the warning system when the manifold vacuum force exceeds a predetermined threshold force, and for opening an disabling the warning system when the manifold vacuum force is less than the predetermined threshold force.

3. The warning system of claim 2, wherein the vacuum mode controller means further comprises:
   a differential flow rate means providing fluid communication between the chamber and the manifold for permitting air to enter the chamber from the manifold causing the contact means to open in response to a manifold vacuum force to less than the threshold force, and for restricting the return flow of air out of the chamber back into the manifold which delays the closing of the contact means in response to a manifold vacuum force greater than the predetermined threshold force.

4. The warning system of claim 3, wherein the differential flow rate means further comprises:
   a disble valve having a unilateral flow for permitting air to freely enter the chamber from the manifold and opposing the return flow thereof;
   a enable valve having a unilateral flow for restricting the return flow of air out of the chamber back into the manifold.

5. The warning system of claim 4, wherein the enable valve requires a predetermined vacuum head thereacross from the manifold side to the chamber side in order to open and permit the return flow of air.

6. The warning system of claim 5, wherein the enable valve is spring loaded toward closed for establishing the predetermined vacuum head.

7. The warning system of claim 3, wherein magnetic energy and thermal energy stored within the system during incandesing of the warning lamp means, prolongs the incandesing period of the lamp means to a time after the hand operated switchingmeans has been restored to the normally open state by the driver and the relay contact means have separated for establishing a minimum lamp incandesing period independently of the length of time that the driver maintains the switching means in the closed position.

8. The warning system of claim 7, further comprising a pedal braking lamp switch which connect the warning lamps to the operating power source means during pedal braking for causing the warning lamps to incandesce.

9. The warning system of claim 8, wherein the isolation relay is a single pull-single throw relay having a pair of normally open contacts connected in bypass relationship with the pedal braking lamp switch for connecting the warning lamps to the operating power source means when the hand operated switch is operated by the driver.

10. The warning system of claim 8, wherein the isolation relay is a single pull-double throw relay having a normally open contact which is closed when the relay is energized for connecting the warning lamps to the operating power source means when the relay is energized, and a normally closed contact for connecting the operating power source means to the pedal braking switch when the relay is de-energized.

* * * * *